United States Patent [19]

Shekleton

[11] Patent Number: 4,996,837
[45] Date of Patent: Mar. 5, 1991

[54] GAS TURBINE WITH FORCED VORTEX FUEL INJECTION

[75] Inventor: Jack R. Shekleton, San Diego, Calif.

[73] Assignee: Sundstrand Corporation, Rockford, Ill.

[21] Appl. No.: 393,097

[22] Filed: Aug. 2, 1989

Related U.S. Application Data

[63] Continuation of Ser. No. 138,341, Dec. 28, 1987, abandoned.

[51] Int. Cl.⁵ .............................................. F02C 3/08
[52] U.S. Cl. .................................... 60/39.36; 60/742; 60/748
[58] Field of Search .............. 60/748, 742, 727, 39.36, 60/743

[56] References Cited

U.S. PATENT DOCUMENTS

| | | |
|---|---|---|
| 3,007,310 | 11/1961 | Eisele . |
| 3,092,964 | 6/1963 | Martin et al. ........................ 60/748 |
| 3,684,186 | 8/1972 | Helmrich ............................. 60/742 |
| 3,703,259 | 11/1972 | Sturgess et al. ...................... 60/742 |
| 3,713,588 | 1/1973 | Sharpe ................................. 60/748 |
| 3,866,413 | 2/1975 | Sturgess .............................. 60/748 |
| 3,886,736 | 6/1975 | Kawaguchi ......................... 60/748 |
| 3,901,446 | 8/1975 | Petreikis, Jr. et al. . |
| 4,105,163 | 8/1978 | Davis, Jr. et al. ................... 60/748 |
| 4,216,652 | 8/1980 | Herman et al. ..................... 60/748 |
| 4,470,262 | 9/1984 | Shekleton . |
| 4,478,045 | 10/1984 | Shekleton . |

*Primary Examiner*—Donald E. Stout
*Attorney, Agent, or Firm*—Wood, Phillips, Mason, Recktenwald & Van Santen

[57] ABSTRACT

High temperature deterioration of an injector 34 for a gas turbine including a compressor and a turbine wheel 10, 14, 30 is avoided through the use of swirler blades 60 that form a forced vortex adjacent the ends 52, 58 of fuel and oxidant injection tubes 38, 40 to prevent separation of the mixed stream thereby eliminating backflows or eddies of burning fuel.

7 Claims, 2 Drawing Sheets

GAS TURBINE WITH FORCED VORTEX FUEL INJECTION

This application is a continuation of application Ser. No. 138,341, filed Dec. 28, 1987, now abandoned.

FIELD OF THE INVENTION

This invention relates to gas turbines, and more specifically, to injectors for the combustors employed in gas turbines.

BACKGROUND OF THE INVENTION

It is known to provide a concentrated oxidant for fuel, as for example, oxygen, in addition to air to the combustor utilized in gas turbine engines. See, for example, U.S. Pat. No. 3,092,964 issued June 11, 1963 to Martin et al. As explained therein, the concentrated oxidant may be provided to the combustor under certain specified conditions as, for example, under conditions in which ignition is uncertain or impossible or in conditions wherein it is difficult to maintain combustion such as at high altitudes. At other times, and generally for the vast majority of the operational cycle of such a turbine, the combustor will be provided only with air and fuel.

The use of a concentrated oxidant such as oxygen under the conditions mentioned previously is effective for overcoming ignition or combustion difficulties under the specified circumstances. However, because of the high reactivity of the concentrated oxidant typically used, separation of the burning fuel and oxidant into a mainstream and one or more eddies or backflows, also of burning fuel, may damage injector components. In particular, because of the high heat generated under such circumstances, the resulting combusting of fuel with the concentrated oxidant may result in the exterior of injector components as, for example, the fuel injection nozzle, being burned and/or eroded, thereby shortening their useful life and lessening the reliability of the gas turbine in which they are employed.

The present invention is directed to overcoming one or more of the above problems.

SUMMARY OF THE INVENTION

It is the principal object of the invention to provide a new and improved gas turbine. More specifically, it is an object of the invention to provide an injector for a gas turbine that may be utilized to periodically inject a concentrated oxidant without being subject to damage as a result of stream separation.

An exemplary embodiment of the invention achieves the foregoing object in a gas turbine including a rotary compressor, a turbine wheel coupled to the compressor, a nozzle for directing combustion gas at the turbine wheel, and a combustor wherein fuel may be combusted and directed to the nozzle. The turbine is provided with at least one injector for the combustor and includes three substantially concentric tubes. The outermost tube is connected to the compressor to receive compressed air therefrom and the innermost tube has a diameter no more than about half the diameter of the outermost tube and is connected to a source of fuel. The intermediate tube is connected to a source of concentrated oxidant for the fuel and means are provided for forcing the compressed air into a vortex about the ends of the innermost and intermediate tubes to prevent stream separation and resulting eddies or backflows of burning fuel in damaging close proximity to the end of at least the innermost tube.

In a highly preferred embodiment, the diameter of the outermost tube is a half inch or less and the turbine is a small scale turbine.

According to the invention the forcing means comprise swirler blades disposed between the intermediate and outermost tubes.

In a preferred embodiment, the swirler blades are relatively straight at their radially inner edges and relatively curved at the radially outer edges. That is to say, the swirler blades extend relatively axially at their radially inner edges and relatively nonaxially at their radially outer edges.

In the preferred embodiment, the vortex is formed at a point where oxidant from the intermediate tube and fuel from the innermost tube meet and mix.

Other objects and advantages will become apparent from the following specification taken in connection with the accompanying drawings.

DESCRIPTION OF THE PREFERRED EMBODIMENT

Figure 1:
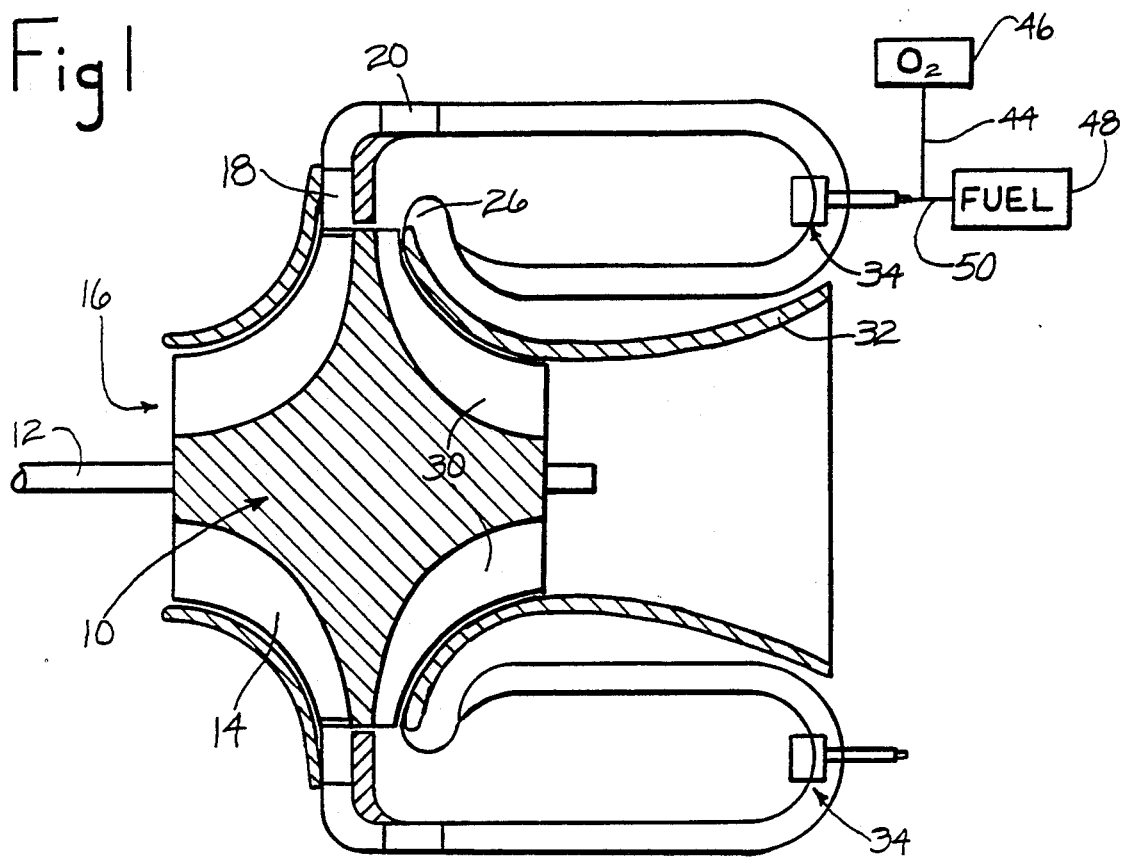
FIG. 1 is a somewhat schematic, sectional view of a gas turbine made according to the invention.

An exemplary embodiment of a gas turbine made according to the invention is illustrated in FIG. 1 and is seen to include a so-called monorotor, generally designated 10, on a shaft 12 journalled for rotation by any suitable means (not shown). Of course, it is to be understood that the invention is not limited to use with gas turbines having monorotors or even coaxial compressor and turbine sections The monorotor 10 includes a plurality of blades 14 which define a radial discharge compressor which takes incoming air from an inlet area 16 and compresses the same. The compressed air exits the periphery of the monorotor 10 into a diffuser 18 of known construction and then passes through deswirl blades 20 into an annulus 22 in surrounding relation to an annular combustor 24. The combustor 24 includes an annular outlet nozzle 26 which opens to the turbine wheel side of the monorotor 10 so as to direct hot gases of combustion against turbine wheel blades 30. This of course spins the rotor 10 about the axis of the shaft 12. Gases of combustion, after impinging upon the blades 30, exit the machine via an exhaust 32.

Useful work may be obtained from operation of the turbine either by coupling a machine to be driven to the shaft 12 or as a result of thrust produced by gases exiting the exhaust 32, or both.

The annular combustor 24 is provided with a plurality of injectors, each generally designated 34, which are typically located at equally angularly spaced locations about the combustor 24. While the injectors 34 are illustrated in FIG. 1 as being axially directed they may be directed in any of a variety of ways, including tangentially as desired.

Figure 2:
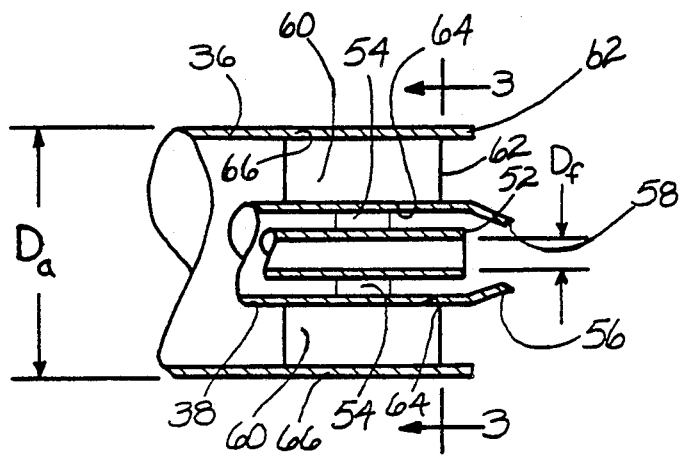
FIG. 2 is an enlarged, fragmentary, sectional view of an injector used in the turbine.

As seen in FIG. 2, each injector is comprised of three, generally concentric, generally cylindrical tubes 36, 38 and 40. The outermost tube is 36 and the innermost tube, 40. The intermediate tube is given the reference numeral 38.

Returning to FIG. 1, one end 42 of the outermost tube 36 opens to the annulus 22 to receive compressed air from the compressor. The tube 36 then passes through the wall of the combustor 24 to the interior thereof and it is by this route that compressed air is provided to the interior of the combustor 24, although air may be admitted to the interior of the combustor 24 by means of other openings as well as is known in the art.

As illustrated in FIG. 1, the intermediate tube 38 is connected by a conduit 44 to a source of a concentrated oxidant, most usually molecular oxygen (02). Control means for controlling the flow of oxidant from the source 46 to the interior of the tube 38 are not illustrated, but will take on any of a variety of known forms employed for the purpose.

A source of fuel 48 is connected via conduit 50 to the tube 40. Fuel will typically be a hydrocarbon fuel as conventionally employed in jet engines, that is, a $C_7H_{16}$ based fuel. Suitable means (not shown) will be employed for pressurizing and metering the flow of fuel from the source 48 to the tube 40.

Returning to FIG. 2, the innermost tube 40 terminates in a nozzle end 52. It is centered within the tube 38 by radial struts 54 which may or may not be configured to impart a swirling motion to the oxidant flowing in the annulus between the tubes 38 and 40.

The tube 38 terminates in a frustoconical end 56 having an opening 58 in alignment with the end 52 of the innermost tube 40. As a consequence of this construction, concentrated oxidant flowing in the annulus between the tubes 38 and 40 will be directed radially inwardly into the stream of fuel emanating from the end 52 of the tube 40 to intimately mix therewith. It should be noted, however, that the frustoconical end 56 is not necessary in every instance and that in some cases the tube 38 may be of uniform diameter along its length as the opening 58 is approached.

The tube 38 is centered within the tube 36 by a plurality of generally radially extending swirler vanes 60. In addition to the locating function performed by the vanes 60, the same impart a swirling motion to the compressed air discharging from the tube 36 at its end 62, the latter being in nominal alignment with the ends 52 and 58 of the tubes 38 and 40 as shown in FIG. 2. This swirling action creates what may be termed a "forced vortex" at the ends 52 and 58 and prevents separation of the stream of mixed fuel and air, and when present, oxygen, into eddies or backflows as may occur in other injector constructions.

Stated another way, the forced vortex of compressed air emanating from the end 62 prevents stream separation such that the entire stream, and not just a major part thereof, moves to the right as viewed in FIG. 2 at least until the vortex forcing action of the swirler blades 60 becomes dissipated. The forced vortex is formed at the point whereat the fuel from the tube 40 and the oxidant from the tube 38 mix or even slightly upstream thereof. Thus, the invention assures that stream separation resulting in eddies or backflows of burning concentrated oxidant and fuel cannot occur adjacent the ends 52, 58 and 62 in sufficiently close proximity thereto as to cause damage as a consequence of the high temperatures generated as a result of using a highly reactive, concentrated oxidant.

The invention is particularly well suited for used in small scale turbine engines which may be considered to be those wherein the effective diameter of the compressed air tube 36 of the injector, which is also the outer diameter of the swirler blades 60, $D_{Ao}$, is no more than about one half inch. It is particularly well suited for use in such small scale turbines where the ratio of the outer diameter $D_{Ao}$ of the swirler blades 60 to the inner diameter $D_{Ai}$ of the swirler blades 60 is greater than two. Thus, the diameter of the injection tube 40, $D_F$, is quite small when compared to the diameter of the swirler blades 60. Typically, a stream separation difficulty occurs when the ratio $D_{Ao}/D_{Ai}$ much exceeds two. Stated another way, the invention will find its greatest utility where the ratio $D_{Ao}/D_{Ai}$ is greater than two.

Figure 3:
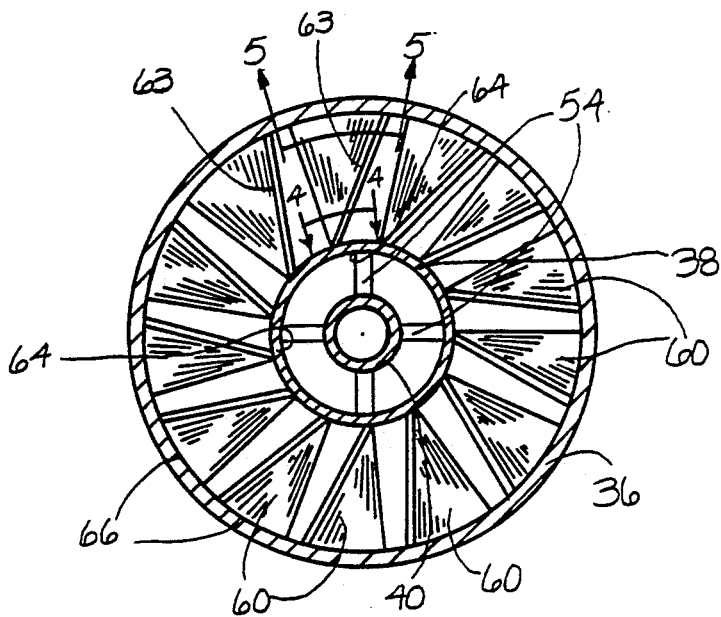
FIG. 3 is a sectional view taken approximately along the line 3—3 in FIG. 2.
Figure 4:
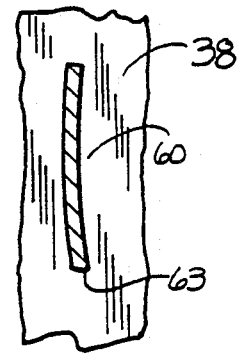
FIG. 4 is a sectional view taken approximately along the line 4—4 in FIG. 3.
Figure 5:
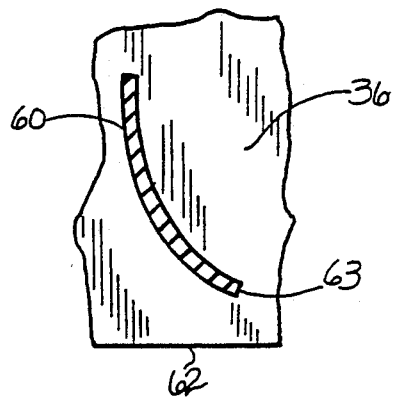
FIG. 5 is a sectional view taken approximately along the line 5—5 in FIG. 3.

In order to provide the forced vortex in the vicinity of the ends 52, 58 and 62 by using the vanes 60, the latter are intended to have a particular configuration. As seen in FIG. 3, the downstream ends 63 of the vanes 60 are nonradial and thus impart a swirling motion To insure that the motion forces the formation of a vortex, as best seen in FIGS. 4 and 5, the radially inner edges, that is, that edge of each vane 60 where it abuts the intermediate tube 38 is relatively straight, extending predominately in the axial direction. Conversely, the radially outer edges 66 of the vanes which abut the outermost tube 36 are curved, and/or nonaxial, having both an axial and a substantial circumferential component.

This is not to say that the inner edges 64 will always be strictly axial, it is only to say that the outer edges 66 will have a greater circumferential component than the inner edges 64.

The result provides the previously mentioned forced vortex which confines the mixed oxidant and fuel stream as the same travels generally axially away from the ends 52, 58 to prevent damaging combustion as a result of stream separation in those areas. After traveling the requisite distance, the stream reverts to conventional free vortex flow and stable combustion results.

From the foregoing, it will be appreciated that the invention provides a means of allowing the use of a concentrated oxidant in special circumstances while eliminating problems heretofore associated with such use.

I claim:

1. A small scale turbine comprising:
    a rotary compressor;
    a turbine wheel coupled to said compressor;
    a nozzle for directing combustion gas at said turbine wheel;
    a combustor wherein fuel may be combusted and directed to said nozzle; and
    at least one injector for said combustor and including three substantially concentric tubes, with at least two of said tubes being of substantially uniform cross section along the axial length thereof, the outermost tube having a diameter of not more than about one-half inch and being connected to said compressor to receive compressed air therefrom, the innermost tube having a diameter no more than half the diameter of said outermost tube and being connected to a source of fuel, and the intermediate tube being connected to a source of concentrated oxidant for the fuel; and means for forcing compressed air into a vortex about the ends of said innermost and intermediate tubes to prevent stream separation and resulting eddies or backflows of burning fuel in damaging close proximity to the end of at least said innermost tube.

2. The small scale turbine of claim 1 wherein said forcing means comprise swirler blades between said intermediate and said outermost tubes.

3. A small scale turbine comprising:
a rotary compressor;
a turbine wheel coupled to said compressor;
a nozzle for directing combustion gas at said turbine wheel;
a combustor wherein fuel may be combusted and directed to said nozzle; and
at least one injector for said combustor and including three substantially concentric tubes, the outermost tube having a diameter of not more than about one-half inch and being connected to said compressor to receive compressed air therefrom, the innermost tube having a diameter no more than half the diameter of said outermost tube and being connected to a source of fuel, and the intermediate tube being connected to a source of concentrated oxidant for the fuel; and
means for forcing compressed air into a vortex about the ends of said innermost and intermediate tubes to prevent stress separation and resulting eddies or backflows of burning fuel in damaging close proximity to the end of at least said innermost tube,
wherein said forcing means comprise swirler blades between said intermediate and said outermost tubes,
wherein said swirler blades are relatively straight at their radially inner edges and relatively curved at their radially outer edges.

4. A small scale turbine comprising:
a rotary compressor;
a turbine wheel coupled to said compressor;
a nozzle for directing combustion gas at said turbine wheel;
a combustor wherein fuel may be combusted and directed to said nozzle; and
at least one injector for said combustor and including three substantially concentric tubes with at least two of said tubes being of substantially uniform cross-section along the axis lengths and at the outlet ends thereof, the outermost tube having a diameter of not more than about one-half inch and being connected to said compressor to receive compressed air therefrom, the innermost tube having a diameter no more than half the diameter of said outermost tube and being connected to a source of fuel, and the intermediate tube being connected to a source of concentrated oxidant for the fuel; and
means for forcing compressed air into a vortex near the ends off said innermost and intermediate tubes at a point where oxidant from said intermediate tube and fuel from said innermost tube meet and mix to prevent stream separation and resulting eddies or backflows of burning fuel in damaging close proximity to the end of at least said innermost tube.

5. The small scale turbine of claim 1 wherein said forcing means comprise swirler blades between said intermediate and said outermost tubes.

6. A small scale turbine comprising:
a rotary compressor;
a turbine wheel coupled to said compressor;
a nozzle for directing combustion gas at said turbine wheel;
a combustor wherein fuel may be combusted and directed to said nozzle; and
at least one injector for said combustor and including three substantially concentric tubes, the outermost tube having a diameter of not more than about one-half inch and being connected to said compressor to receive compressed air therefrom, the innermost tube having a diameter no more than half the diameter of said outermost tube and being connected to a source of fuel, and the intermediate tube being connected to a source of concentrated oxidant for the fuel; and
means for forcing compressed air into a vortex near the ends off said innermost and intermediate tubes at a point where oxidant from said intermediate tube and fuel from said innermost tube meet and mix to prevent stream separation and resulting eddies or backflows of burning fuel in damaging close proximity to the end of at least said innermost tube.
wherein said forcing means comprise swirler blades between said intermediate and said outermost tubes,
wherein said swirler blades extend relatively axially at their radially inner edges and relatively nonaxially at their radially outer edges.

7. A turbine comprising:
a rotary compressor;
a turbine wheel coupled to said compressor;
a nozzle for directing combustion gas at said turbine wheel;
a combustor wherein fuel may be combusted and directed to said nozzle; and
at least one injector for said combustor and including three substantially concentric tubes, the outermost tube being connected to said compressor to receive compressed air therefrom, the innermost tube having a diameter no more than half the diameter of said outermost tube and being connected to a source of fuel, and the intermediate tube being connected to a source of concentrated oxidant for the fuel; and
means for forcing compressed air into a vortex about the ends of said innermost and intermediate tubes to prevent stream separation and resulting eddies or backflows of burning fuel in damaging close proximity to the end of at least said innermost tube, said forcing means comprising swirler blades between said intermediate and said outermost tubes and being relatively axially at their radially inner edges and relatively curved at their radially outer edges.

* * * * *